ELECTRONIC FREQUENCY ELIMINATING APPARATUS
Filed Dec. 31, 1949 2 SHEETS—SHEET 1
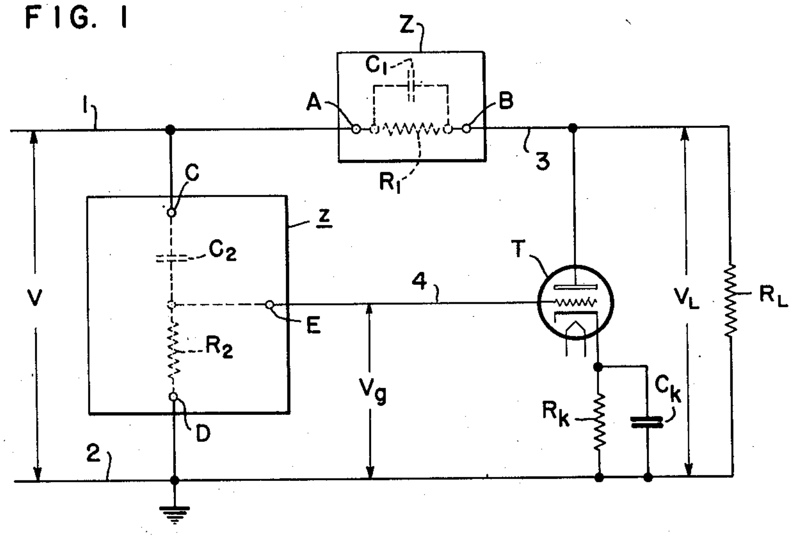
FIG. 1
FIG. 6
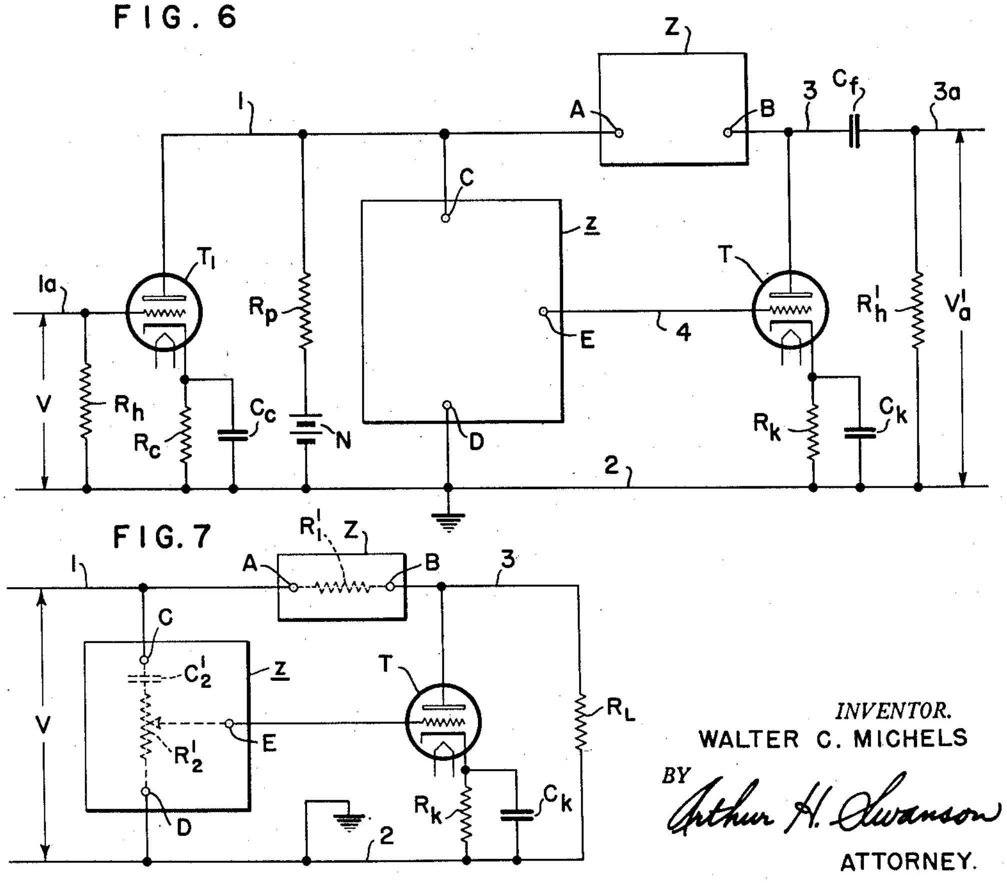
FIG. 6, FIG. 7
INVENTOR.
WALTER C. MICHELS
BY Arthur H. Swanson
ATTORNEY.

Sept. 2, 1952 W. C. MICHELS 2,609,446

ELECTRONIC FREQUENCY ELIMINATING APPARATUS

Filed Dec. 31, 1949 2 SHEETS—SHEET 2

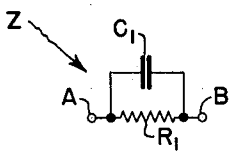

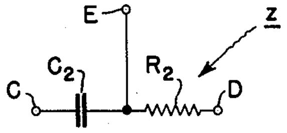

FIG. 2

$$Z_0 = \frac{R_1}{(1+\omega_0^2 C_1^2 R_1^2)^{1/2}}$$

$$\tan\phi 1 = -\omega_0 C_1 R_1$$

$$K_0 = \frac{\omega_0 R_2 C_2}{(1+\omega_0^2 C_2^2 R_2^2)^{1/2}}$$

$$\tan\phi 2 = \frac{1}{\omega_0 C_2 R_2}$$

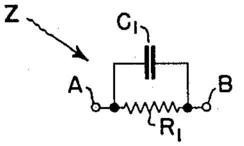

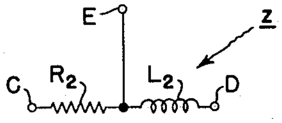

FIG. 3

$$Z_0 = \frac{R_1}{(1+\omega_0^2 C_1^2 R_1^2)^{1/2}}$$

$$\tan\phi 1 = -\omega_0 C_1 R_1$$

$$K_0 = \frac{\omega_0 L_2}{(R_2^2+\omega_0^2 L_2^2)^{1/2}}$$

$$\tan\phi 2 = \frac{R_2}{\omega_0 L_2}$$

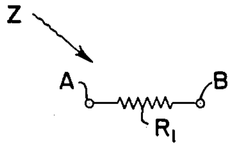

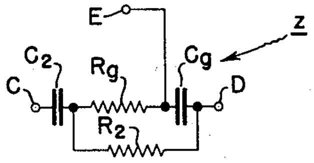

FIG. 4

$$Z_0 = R_1$$

$$\tan\phi 1 = 0$$

$$K_0 = \frac{\omega_0^2 C_2 R_2 [C_2 R_2 + C_g(R_2+R_g)]}{4+\omega_0^2 [C_2 R_2 + C_g(R_2+R_g)]^2}$$

$$\tan\phi 2 = \frac{\omega_0^2 R_g R_2 C_g C_2 - 1}{\omega_0 [C_g(R_2+R_g)+C_2 R_2]}$$

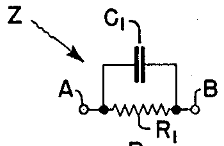

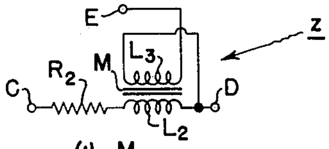

FIG. 5

$$Z_0 = \frac{R_1}{(1+\omega_0^2 C_1^2 R_1^2)^{1/2}}$$

$$\tan\phi 1 = -\omega_0 C_1 R_1$$

$$K_0 = \frac{\omega_0 M}{(R_2^2+\omega_0^2 L_1^2)^{1/2}}$$

$$\tan\phi 2 = \frac{R_2}{\omega_0 L_1}$$

*INVENTOR.*
WALTER C. MICHELS
*BY* Arthur H. Swanson
ATTORNEY.

Patented Sept. 2, 1952 2,609,446

UNITED STATES PATENT OFFICE 2,609,446

ELECTRONIC FREQUENCY ELIMINATING APPARATUS

Walter C. Michels, Strafford, Pa., assignor to Minneapolis-Honeywell Regulator Company, Minneapolis, Minn., a corporation of Delaware Application December 31, 1949, Serial No. 136,340

6 Claims. (Cl. 178—44)

The general object of the present invention is to provide an improved frequency selective electric circuit. A primary object of the invention is to provide a simple and effective frequency eliminating, transconductance bridge, including an electronic valve and resistance and reactance elements having such values and being so arranged as to eliminate a component of predetermined frequency from a pulsating potential supplied to the bridge by a rectifier, amplifier, or any source of such potential. A further primary object of the invention is to combine with the electronic valve and resistance and reactance elements of the above mentioned bridge circuit a second electronic valve and other resistance and reactance elements, thereby to form a band-elimination amplifier.

One desirable form of the invention illustrated and described herein is well adapted for use in eliminating a ripple component of some one particular frequency from a pulsating unidirectional current, and, in particular, for use in eliminating the ripple component, in the output circuit of a full wave rectifier, which is of a frequency double that of the alternating current rectified. The novel frequency eliminating, transconductance bridge circuit which I have devised for such use is simpler, less bulky, of less weight, and less expensive to construct than circuits previously devised for ripple elimination purposes.

A more specific object of the invention is to provide a frequency eliminating, transconductance bridge circuit, operative to eliminate from its output voltage a component of predetermined frequency present in the bridge supply or input voltage, and including an electronic triode valve and associated resistance and reactance elements of such values and so relatively arranged that the grid potential of the valve, relative to the cathode thereof, is not appreciably affected by the steady component of the supply voltage, but is controlled by the supply voltage component to be eliminated. The bridge circuit of the present invention is further characterized by the absence therefrom of any form of voltage regulator device, such as a glow discharge tube, or source of substantially constant potential, such as a battery or bias cell.

For performing its intended function, the disclosed novel bridge circuit includes an impedance through which flows the plate current of the aforementioned triode valve and across which this current produces a voltage drop of a magnitude which is substantially equal to the magnitude of the supply voltage component to be eliminated, and of a phase or instantaneous polarity which is opposite to that of the last mentioned component. Said voltage drop is, moreover, applied between the input and output portions of said bridge circuit, whereby said last mentioned component is effectively eliminated from the output voltage of the bridge circuit, and is not present in the plate and cathode supply potentials applied to the aforementioned triode valve.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a diagram illustrating the frequency eliminating, transconductance bridge of the present invention;

Fig. 2 is a view diagrammatically illustrating one set of related circuit elements and circuit element values for use in the circuit shown in Fig. 1;

Figs. 3, 4, and 5 are diagrams similar in character to that shown in Fig. 2, each illustrating a different combination of related circuit elements and circuit element values;

Fig. 6 is a diagram illustrating a band-elimination amplifier circuit utilizing the bridge of Fig. 1; and Fig. 7 is a diagram illustrating a modification of the transconductance bridge shown in Fig. 1.

The frequency eliminating, transconductance bridge circuit shown in Fig. 1 includes input conductors 1 and 2, and a load resistor $R_L$. As shown, the conductor 2 is connected to ground and to one end of the load resistor $R_L$. The other end of the resistor $R_L$ is connected to the input conductor 1 by a conductor 3 and an impedance element Z, the impedance element Z having a first terminal A directly connected to the conductor 1, and having a second terminal B directly connected to the conductor 3. A second impedance element $z$ is directly connected between the input conductors 1 and 2, this impedance having one end terminal C directly connected to the conductor 1, and having a second end terminal D directly connected to the grounded conductor 2. The impedance $z$ has an intermediate terminal E which is connected by a conductor 4 to the control electrode or grid of an electronic valve T. The latter, as shown, is a triode having an output electrode or plate directly connected to the conductor 3, and having a second output electrode or cathode connected to the grounded conductor 2 by a cathode bias resistor $R_k$ and by a bypass condenser $C_k$ connected in parallel with the resistor $R_k$.

For the purposes of the present invention, the impedance $z$ may take different forms, and, by way of example, I have illustrated different forms of the impedance $z$ in each of Figs. 2, 3, 4, and 5. Each form of the impedance $z$ must be associated with an impedance Z of a form suitably related to the form of the impedance $z$. The necessary relation between the forms of the impedances $z$ and Z involves the character of the circuit elements included in the impedances and the values of those elements.

To facilitate an understanding of the invention, I have included in the bridge circuit shown in Fig. 1 a dotted line showing of the related circuit elements forming the particular impedances $z$ and Z illustrated in Fig. 2. As shown in Fig. 2, the impedance Z comprises a resistor $R_1$ and a condenser $C_1$, each connected between the terminals A and B in parallel with the other. The corresponding impedance $z$ of Fig. 2 includes a condenser $C_2$, having one terminal connected to the terminal C and thereby to the supply conductor 1, and having its second terminal connected to the terminal D through a resistor $R_2$. The connected terminals of the condenser $C_2$ and resistor $R_2$ are connected to the third terminal E of the impedance $z$.

In Fig. 1, V represents the supply or input voltage applied between the input conductors 1 and 2, and $V_L$ represents the potential difference or output voltage between the conductors 3 and 2: i. e., the voltage drop across the load resistor $R_L$. $V_g$ represents the grid voltage or potential difference between the grid of the valve T and the ground potential.

As will be apparent, there are three components of current flowing through the impedance Z. Hence, there are three voltage drops produced thereacross, the vectorial summation of which equals the total voltage across the impedance Z. These voltage drops are:

$$(i_0 e^{j(\omega_0 t+\phi)})(Z_0 e^{j\phi 1}) \quad (1)$$

$$(\bar{I}_T)(\bar{Z}) \quad (2)$$

and $$\left(\frac{V_L}{R_L}\right)(\bar{Z}_1) \quad (3)$$

where:

$\bar{I}_T$=the steady plate current component and fluctuating plate current components of all frequencies other than $f_0$ flowing through the valve T;

$f_0$=the frequency of the component to be filtered from the input voltage V;

$i_0 e^{j(\omega_0 t+\phi)}=\bar{i}$=the fluctuating plate current component at the frequency $f_0$ flowing through the valve T;

$\bar{I}_T+\bar{i}$=the total plate current flow through the valve T;

$\omega_0=2\pi f_0$ $Z_0 e^{j\Phi 1}$=the vector impedance of the impedance Z at the frequency $f_0$;

$\phi$=the phase angle of the current $i_0$ at the frequency $f_0$;

$\phi 1$=the phase angle of the impedance Z at the frequency $f_0$;

$\bar{Z}$=the vector impedance of the impedance Z at the frequencies of the current $\bar{I}_T$; and $\bar{Z}_1$=the vector impedance of the impedance Z at the frequencies of the current $$\frac{V_L}{R_L}$$

Of the three voltage drops listed above as being produced across the impedance Z, it should be obvious that the drop represented by Equation 1 is produced by the flow through the impedance Z of the tube plate current $\bar{i}$; that the drop represented by Equation 2 is produced by the flow through the impedance Z of the tube plate current $\bar{I}_T$; and that the drop represented by Equation 3 is produced by the flow through the impedance Z of the load current $$\frac{V_L}{R_L}$$

With a proper choice of values for the various elements included in the circuit shown in Fig. 1, the voltage $V_L$ produced across the load resistor $R_L$ will include no component of the fluctuating input voltage V at the frequency $f_0$, which is the frequency of the component to be eliminated. Hence, $\bar{Z}_1$ will be equal to $\bar{Z}$, and the relation of V to $V_L$ will then be given by the following equation:

$$V=V_L+\left(\bar{I}_T+\frac{V_L}{R_L}\right)\bar{Z}+(i_0 e^{j(\omega_0 t+\phi)})(Z_0 e^{j\phi 1}) \quad (4)$$

The input voltage V can be represented as the sum of two voltage terms as follows:

$$V=\bar{V}_1+V_0 e^{j\omega_0 t} \quad (5)$$

where the term $\bar{V}_1$ represents the aggregate of the steady input voltage component and the fluctuating voltage components, of all frequencies other than $f_0$, which are included in the voltage V. The term $$V_0 e^{j\omega_0 t}$$

represents only the fluctuating component of frequency $f_0$.

If the components of frequencies other than $f_0$ are ignored in Equations 4 and 5, as they may properly be in the linear network of Fig. 1, these equations when combined become:

$$V_0 e^{j\omega_0 t}=i_0 Z_0 e^{j(\omega_0 t+\phi+\phi 1)} \quad (6)$$

As a result of the component $$V_0 e^{j\omega_0 t}$$

of the frequency $f_0$ in the input voltage V, the potential $V_g$ of the grid of the valve T, relative to ground, will be given by the following equation:

$$\bar{V}_g=\bar{K}V_0 e^{j\omega_0 t} \quad (7)$$

where $\bar{K}$ is a complex transfer characteristic having the form $\bar{K}=K_0 e^{j\phi 2}$, where $\phi 2$ is the phase angle of the impedance $z$ at the frequency $f_0$.

For the purposes of the present invention, the circuit element values of the bridge circuit shown in Fig. 1 are chosen, as hereinbefore explained, so that the output voltage $V_L$, and hence the potentials on the plate and the cathode of the valve T, with respect to ground, have no components of frequency $f_0$. In consequence, the only change in the operation of the valve T, due to components of frequency $f_0$, is produced by variations in the voltage $V_g$.

On the assumption that $\sigma$ represents the transconductance of the valve T, the value of the plate current component of frequency $f_0$ flowing through the valve T is given by the following equation:

$$\sigma V_g=\sigma K_0 V_0 e^{j(\omega_0 t+\phi 2)}=i_0 e^{j(\omega_0 t+\phi)} \quad (8)$$

Multiplying the second and third portions of Equation 8 by $Z_0e^{j\phi 1}$ gives:

$$\sigma K_0 V_0 Z_0 e^{j(\omega_0 t+\phi 1+\phi 2)} = i_0 Z_0 e^{j(\omega_0 t+\phi+\phi 1)} \quad (9)$$

The inventive principle and characteristic of the bridge circuit shown in Fig. 1 is that the input voltage component $$V_0 e^{j\omega_0 t}$$

provides the valve T with the grid-cathode voltage required to produce a potential drop across the impedance Z which is equal in magnitude and opposite in phase or instantaneous polarity to the voltage $$V_0 e^{j\omega_0 t}$$

and which causes all components having the frequency $f_0$ to be eliminated from the current flowing through the load resistor $R_L$. This relationship can be written:

$$V_0 e^{j\omega_0 t} = i_0 Z_0 e^{j\omega_0 t} \quad (10)$$

In order for Equations 6 and 9, representing the relationships existing in the circuit of Fig. 1, to agree with Equation 10, representing the desired operation of the Fig. 1 arrangement, it is obvious that the following relationships must exist:

$$\sigma K_0 Z_0 = 1 \quad (11)$$

$$\phi 1 = -\phi 2 \quad (12)$$

and $$\phi = -\phi 1 \quad (13)$$

whence $$\phi = -\phi 2 \quad (14)$$

In the present invention, the necessary relationships expressed by Equations 11 and 12 are achieved in practice by a proper selection of the component values of the impedances Z and $z$, as will be fully explained hereinafter. The relationship expressed by Equation 14 is fulfilled by the normal operating characteristic of the valve T, while the relationship of Equation 13 results from the existence of the relationships of Equations 12 and 14.

Since $\omega$ appears in the equations for $\phi 1$ and $\phi 2$, as shown in Figs. 2 through 5, Equation 12 can be satisfied only for the one frequency, $f_0$, which the Fig. 1 circuit is designed to eliminate.

The foregoing Equations 11 and 12 set forth the two general conditions for any pair of impedances or networks Z and $z$ which are so related as to be useful in the bridge circuit shown in Fig. 1 to effect complete elimination of any input voltage component having the frequency $f_0$. However, the controlling conditions of Equations 11 and 12 must be supplemented by the further condition that the impedance $z$ must be of such character as to prevent the grid potential of the valve T, relative to ground, from being appreciably affected by the steady component of the input voltage V. Any two networks Z and $z$ which satisfy all of these three conditions are suitably related and in suitable correspondence for use in the bridge circuit shown in Fig. 1.

To insure that the cathode potential of the valve T will contain no voltage components of the frequency $f_0$, and hence will remain constant insofar as that frequency is concerned, it is only necessary to select the values of the cathode bias resistor $R_k$ and bypass condenser $C_k$ so that the cathode impedance $R_kC_k$ will be suitably small at the frequency $f_0$. It is possible, in all cases, to choose $C_k$ so that:

$$\frac{\bar{I}_V+\bar{i}}{\omega_L C_K} \ll V_g \quad (15)$$

where $\omega_L$ is the lowest frequency present in the fluctuating portion of the input voltage, and $\bar{I}_v$ is the variable plate current of the valve T for all frequencies except $f_0$. This choice of the value for the condenser $C_k$ leaves the resistance of resistor $R_k$ completely undetermined, so that this latter value may be chosen to insure operation of the circuit on the linear portion of the characteristic transfer curve of the valve T. Since, as pointed out above, the impedance $z$ is always of such a character as to prevent the steady component of the input voltage from affecting the potential between the grid of the valve T and ground, the resistance value of the resistor $R_k$ is the sole component value which is used for determining the operating characteristic of the valve T.

Each of the related pairs of impedance elements Z and $z$ shown in Figs. 2, 3, 4, and 5 satisfies the three conditions specified above, and is therefore adapted for use in the circuit shown in Fig. 1. The impedances Z and $z$ of Fig. 2 include the circuit elements shown in dotted lines in Fig. 1, and previously described. In each of Figs. 3 and 5, the impedance Z consists of a resistor $R_1$ and a condenser $C_1$ connected in parallel as in Figs. 1 and 2. In Fig. 4, the impedance Z includes only the resistor $R_1$.

As previously noted, the impedance element $z$ in the form shown in Figs. 1 and 2 comprises a condenser $C_2$ and a resistor $R_2$ connected in series between the terminals C and D. The connected terminals of the condenser $C_2$ and resistor $R_2$ are also connected to the terminal E.

In Fig. 3, the impedance $z$ consists of a resistor $R_2$ having one terminal connected to the terminal C and thereby to the supply conductor 1, and an inductor $L_2$ having one terminal connected to the terminal D and thereby to the supply conductor 2. The second terminals of the resistor $R_2$ and the inductor $L_2$ are connected to each other and to the terminal E. The resistance of the inductor $L_2$ should be small in comparison to the resistance of the resistor $R_2$.

The impedance $z$ shown in Fig. 4 differs in form from the impedance $z$ shown in Fig. 1 by the inclusion of a second resistor $R_g$ and a second condenser $C_g$. The resistor $R_g$ and condenser $C_g$ in Fig. 4 are connected in parallel with the resistor $R_2$ between the terminal D and the condenser $C_2$. The terminal E is connected to the condenser $C_2$ through the resistor $R_g$ and is connected to the terminal D through the condenser $C_g$.

The form of the impedance $z$ shown in Fig. 5 differs from the form shown in Fig. 3 in that the inductance $L_2$ connected in series with the resistor $R_2$ in Fig. 5 constitutes the primary winding of a transformer M. The net impedance introduced by the transformer M must be small in comparison to the resistance of the resistor $R_2$. The secondary winding $L_3$ of the transformer M is connected between the terminal E and the terminal D of the impedance $z$ of Fig. 5, the connection being such that the alternating voltage between the terminals E and D is opposite in phase to the voltage between the terminals C and D.

Fig. 2 includes equations for the values of the impedance Z, the transfer characteristic K, and the tangents of the phase angles $\phi 1$ and $\phi 2$, expressed in terms of the circuit elements $R_1$, $R_2$, $C_1$, and $C_2$ required for the elimination from the output voltage $V_L$ of components having the frequency $f_0$. The frequency $f_0$ is included in these equations in the expression $\omega_0$. When account is taken of the fact that the phase angles $\phi 1$ and $\phi 2$ are equal in magnitude and opposite in sign, it will be apparent that the equations shown in Fig. 2 are readily solvable by simple algebraic methods. Any suitable values may be used for the values of the components $R_1$, $R_2$, $C_1$, and $C_2$, providing that such values satisfy the above equations and comply with the additional requirement or condition, noted above, that the voltage $V_g$ be unaffected by the steady component of the input voltage V.

Similarly, in each of Figs. 3, 4, and 5, equations are included which are readily solvable to determine the values of the impedance components included in the impedance elements Z and $z$ illustrated in these figures.

While the frequency eliminating, transconductance bridge circuit shown in Fig. 1 is operative and can advantageously be employed to eliminate a single frequency ripple component from the output voltage of a power supply including a rectifier, it is not a voltage regulator, and will not compensate for slow changes in the magnitude of the input voltage supplied to it. The circuit shown in Fig. 1 is adapted to replace the usual assortment of filter chokes and condensers in a conventional rectifier-type power supply, and has the advantage over conventional apparatus that it requires no stable voltage supply for the valve T, and that it is lighter in weight and less bulky than similar power supply filters using chokes and condensers. When voltage regulation is desired, it can be obtained by the use of a circuit network in which the circuit shown in Fig. 1 is accompanied by a voltage regulator of one or another conventional type. When the circuit shown in Fig. 1 is employed to eliminate a particular ripple component in the output voltage of a rectifier, harmonics of the particular ripple frequency can be eliminated by careful rectifier design, or can be greatly reduced by connecting a small condenser across the load resistor $R_L$.

The circuit shown in Fig. 1 differs from a typical, known transconductance bridge voltage regulator essentially in that such a regulator includes neither of the condensers $C_1$ and $C_2$, or any equivalent therefor. In Fig. 1, the condenser $C_2$ serves the purpose of isolating the control grid of the valve T from the steady component of the supply voltage V, thereby permitting the use of a simple cathode bias resistor in lieu of a source of standard voltage of a high degree of consistency. In the Fig. 1 circuit, the condenser $C_2$ produces a shift in the phase angle of the plate current $i_0$ of the valve T, but the condenser $C_1$ compensates for this phase shifting action of the condenser $C_2$. Without the inclusion in Fig. 1 of the condenser $C_2$ or some alternative means for effecting the above mentioned isolating action, the input signal impressed on the valve T, and also the bias or operating point for that valve, would depend upon the values of both the cathode bias resistor $R_k$ and the lower portion of the impedance element $z$. In such a case, the interdependence of resistor $R_k$ and the lower portion of the impedance $z$ would be sufficient to prevent the Fig. 1 circuit from being operative for its intended purpose, since it would then be impossible to operate the valve V in the manner desired.

The fact that the frequency eliminating, transconductance bridge circuit shown in Fig. 1 will completely eliminate only components having a given frequency permits the use of the circuit in the construction of an effective and relatively simple band-elimination amplifier.

Fig. 6 illustrates a circuit including the elements Z, $z$, T, $R_k$ and $C_k$ arranged relative to one another in a frequency eliminating, transconductance bridge circuit as they are in Fig. 1, and associated with other circuit elements to form a band-elimination amplifier operative to pass signals of all frequencies differing appreciably from the frequency $f_0$. The band-elimination amplifier of Fig. 6 includes an electronic valve $T_1$ having plate, control grid, and cathode elements. The input signal V for the amplifier is applied between a conductor 1*a*, connected to the control grid of the valve $T_1$, and the grounded conductor 2, which is connected to the cathode of the valve $T_1$ by a cathode bias resistor $R_c$. A cathode bypass condenser $C_c$ is connected in parallel with the resistor $R_c$, and a grid resistor $R_h$ is connected between the conductors 1*a* and 2. Consequently, the amplifier input voltage V is applied between the control grid and cathode of the valve $T_1$.

The output of the valve $T_1$ is connected to the output of the amplifier of Fig. 6 through the elements constituting the transconductance bridge circuit portion of the amplifier. To this end, the input conductors 1 and 2 of the bridge circuit are connected in the output circuit of the valve $T_1$, while the bridge circuit output conductors 3 and 2 are connected to the respective amplifier output conductors 3*a* and 2. Specifically, the bridge circuit input conductor 1 directly connects the plate of the valve $T_1$ with the terminals A and C of the respective impedance elements Z and $z$ of the bridge circuit. As before, the conductor 2 is connected to the terminal D of the impedance $z$ and to the cathode of the valve T through the parallel-connected resistor $R_k$ and condenser $C_k$. The plate circuits of the valves $T_1$ and T are supplied with energizing voltage by a battery N, the negative terminal of which is connected to the conductor 2. The positive terminal of the battery N is connected through a plate load resistor $R_p$ to the conductor 1.

As in the arrangement of Fig. 1, the control grid of the valve T is connected by a conductor 4 to the terminal E of the impedance $z$. Likewise, the plate of the valve T is connected to the output conductor 3 and to the terminal B of the impedance Z. In Fig. 6, however, the bridge output conductor 3 is connected to the amplifier output conductor 3*a* by a coupling condenser $C_f$. A load resistor $R_h'$ is connected between the amplifier output conductors 3*a* and 2.

The band-elimination amplifier shown in Fig. 6 is operative to produce between the output conductors 3*a* and 2 an output signal $V_a'$ which is substantially free from any components of the frequency $f_0$, even though components of this frequency may be present in the input signal V.

In the circuit shown in Fig. 6, the battery N supplies plate voltage to the valve $T_1$ and also to the valve T. In consequence, the valve T must be capable of operating on a linear portion of its characteristic transfer curve at a plate voltage which is the same as, or lower than, the plate voltage at which the valve $T_1$ operates. The valve $T_1$ should have transconductance and plate resistance characteristics which are so chosen that the impedance of the element Z can be relatively small and the impedance in parallel with the valve $T_1$ can be relatively large. The effect of the circuit shown in Fig. 6 on frequencies appreciably different from the eliminated frequency $f_0$ will be very small if the value of the impedance Z is small. The value of the impedance $z$ should be large in comparison with the plate resistance of the valve T and with the resistor $R_p$ so that it does not appreciably lower the gain obtained with the amplifier. The conditions just mentioned are ideal for a band-elimination amplifier.

In Fig. 7 there is illustrated a modification of the transconductance bridge circuit of Fig. 1 which is operative to eliminate, from an input voltage, components of a plurality of different frequencies. Thus, the Fig. 7 arrangement differs from that shown in Fig. 1 wherein components of only a single frequency are eliminated.

The arrangement shown in Fig. 7 is identical in construction to the Fig. 1 arrangement except in regard to the components constituting the impedance elements Z and $z$, and to the values of these components. Specifically, the impedance $z$ of Fig. 7 includes a condenser $C_2'$ having one terminal connected to the terminal C, and having a second terminal connected through a resistor $R_2'$ to the terminal D. Engaging the resistor $R_2'$ is an adjustable contact which is connected to the terminal E and hence to the control grid of the valve T.

In choosing the particular values for the condenser $C_2'$ and resistor $R_2'$ of Fig. 7, the object is to secure a high ratio between the portion of the input voltage appearing between the terminals E and D, and the portion of the input voltage appearing between the terminals C and E for the lowest frequency to be eliminated. That is, the values of the elements $C_2'$ and $R_2'$ are chosen so that the voltage drop across the resistor $R_2'$ is many times greater than the voltage drop across the condenser $C_2'$ at the lowest of the frequencies of the components to be eliminated from the input voltage. When said values are chosen in this manner, substantially all of the fluctuating portion of the input voltage V for frequencies above the lowest frequency to be eliminated will appear across the resistor $R_2'$, and hence will be applied to the input of the valve T to control the latter. Accordingly, such a choice of values will result in the development across the resistor $R_2'$ of a voltage at the lowest of the frequencies to be eliminated which will be sufficient to produce across the impedance Z an opposing voltage of sufficient magnitude to prevent the appearance across the load resistor $R_L$ of any components having said lowest frequency. Further, for frequencies above said lowest frequency, the ratio of the voltage between the terminals E and D and the voltage between the terminals C and E will be greater than at said lowest frequency, and will increase in the presence of components of increasing frequency in the input voltage V. Therefore, the impedance $z$ of Fig. 7 will be operative to apply to the valve T sufficient control voltage to effect cancellation of substantially all input voltage components at or above the predetermined lowest frequency for which the circuit is designed.

By way of illustration, but not by way of limitation, it is noted that said ratio between the voltages produced across the elements $R_2'$ and $C_2'$ by input voltage components of the lowest frequency to be eliminated may be of the order of 1,000:1 to obtain satisfactory operation of the apparatus shown in Fig. 7. Further, by way of example, if said lowest frequency to be eliminated is 60 C. P. S., a ratio of 1,000:1 for the voltages across the elements $R_2'$ and $C_2'$ at this frequency could be obtained by making the value of resistor $R_2'$ 2 megohms and the value of the condenser $C_2'$ 1 microfarad, and by positioning the contact at the upper end of the resistor $R_2'$. In instances where it may be desirable to change from time to time the value of the lowest frequency which is to be eliminated by the apparatus, it will be advantageous to give the resistor $R_2'$ a higher value than normal, whereby the contact can then be adjusted to the position along the resistor $R_2'$ which gives the desired voltage ratio for the particular lowest frequency to be eliminated.

In a circuit of the form shown in Fig. 7 designed with the frequency and component values just given by way of example, it is obvious that any input voltage components of frequencies greater than 60 C. P. S. will also be prevented from appearing in the output voltage across the resistor $R_L$. In fact, components at these higher frequencies will be eliminated from the output voltage even more effectively than 60 C. P. S. components are eliminated, inasmuch as greater percentages of these higher frequency components will be applied to control the valve T, due to the decrease in the capacitive reactance of the condenser $C_2'$ with increased frequency. The upper limit for frequencies so eliminated, however, is the frequency at which other capacitive reactances in the circuit of Fig. 7 become appreciable and affect the operation of the apparatus.

Since at and above the chosen lowest frequency to be eliminated the control voltage for the valve T appearing between the terminals E and D is substantially due to the drop across resistor $R_2'$ and hence may be considered to be practically independent of the condenser $C_2'$, said control voltage will be substantially in phase with the input voltage V in the arrangement of Fig. 7, and accordingly, no substantial phase shift is produced in this form of the invention by the impedance $z$. In view of this, the impedance Z of Fig. 7 need not provide any phase shift compensation as it does in the arrangement of Fig. 1, whereby the impedance Z of Fig. 7 need consist of only a resistor $R_1'$, as shown. From this it is apparent that in the Fig. 7 apparatus, the condenser $C_2'$ provides only an isolating function for input voltage components of frequencies below the lowest frequency to be eliminated, and produces no significant phase shift above said lowest frequency requiring compensation by the impedance Z.

While, in accordance with the provisions of the statutes, I have illustrated and described the best form of my invention now known to me, it will be apparent to those skilled in the art that changes may be made in the forms of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent, is:

1. A frequency eliminating, transconductance bridge circuit comprising first and second input conductors adapted to be connected across a source of voltage having a steady voltage component and a plurality of fluctuating voltage components of various frequencies including at least one fluctuating voltage component of a predetermined frequency to be eliminated, a load impedance having one end connected to said second conductor, a third conductor connected to the second end of said load impedance, a first impedance device connected between said first and third conductors, an electronic valve having a first output electrode connected to said third conductor, having a second output electrode, and having a control electrode, a bias resistor connecting said second output electrode to said second conductor, the value of said bias resistor being so chosen as to cause the operation of said valve to take place over a substantially linear portion of the characteristic transfer curve of said valve, a bypass condenser connected in parallel with said resistor, a second impedance device having three terminals, a connection between one of said terminals and said first conductor, a connection between the second of said terminals and said second conductor, a connection between the third of said terminals and said control electrode, a resistive element and a reactive element included in said second impedance device and connected in series between said one and said second terminals, a connection between said third terminal and said elements operative to apply the voltage drop across one of said elements between said control electrode and said second output electrode, the values of said elements being so chosen as to cause said voltage drop to consist solely of a signal fluctuating solely at said predetermined frequency and having a magnitude which is dependent solely upon the magnitude of said one fluctuating voltage component and which is independent of the magnitude of said steady voltage component, the value of said bypass condenser being so chosen as to prevent the appearance across said bias resistor of any voltage having said predetermined frequency, said valve being operative, under the control of said signal, to produce across said first impedance device a voltage drop solely of said predetermined frequency and of a magnitude dependent upon that of said signal, the values of the elements of said impedance devices being so chosen as to cause the magnitude of the last mentioned voltage drop to be substantially equal to that of said one fluctuating voltage component, and a second condenser included in one of said impedance devices and having such a value as to be operative to cause said voltage drop across said first impedance device to be of the proper phase to effect substantially complete cancellation of said one fluctuating voltage component and hence to prevent the appearance of any voltage of said predetermined frequency across said load impedance, whereby the appearance across said load impedance of the other of said fluctuating voltage components and of said steady voltage component is not appreciably affected.

2. Apparatus as specified in claim 1, wherein the values and connections of the elements included in said impedance devices are such that $$\sigma \overline{K}\overline{Z}=1$$

where $\sigma$ represents the transconductance of said valve, $\overline{K}$ represents the complex ratio of said signal to the voltage between said one and said second terminals of said second impedance device at said predetermined frequency, and $\overline{Z}$ represents the complex impedance value of said first impedance device at said predetermined frequency, and wherein the last mentioned values and connections are also such that $$\phi 1=-\phi 2$$

where $\phi 1$ represents the phase angle of said first impedance device at said predetermined frequency, and $\phi 2$ represents the phase angle of said second impedance device at said predetermined frequency.

3. Apparatus as specified in claim 1, wherein said reactive element is a third condenser directly connected between said one and said third terminals of said second impedance device, and wherein said first impedance device includes a resistor directly connected between said first and third conductors and includes said second condenser connected in parallel with the last mentioned resistor.

4. Apparatus as specified in claim 1, wherein said reactive element is an inductor directly connected between said second and third terminals of said second impedance device and having a resistance which is small compared to that of said resistive element, and wherein said first impedance device includes a resistor directly connected between said first and third conductors and includes said second condenser connected in parallel with the last mentioned resistor.

5. Apparatus as specified in claim 1, wherein said reactive element is a third condenser having one terminal connected to said one terminal of said second impedance device, wherein said second impedance device includes a second resistive element having one terminal connected at a junction to the remaining terminal of said third condenser and having its other terminal connected to said third terminal of said second impedance device, wherein the first mentioned resistive element is connected between said junction and said second terminal of said second impedance device, wherein said second condenser is connected between said second and third terminals of said second impedance device, and wherein said first impedance device consists solely of a resistor directly connected between said first and third conductors.

6. Apparatus as specified in claim 1, wherein said reactive element is the primary winding of a transformer having a secondary winding connected between said second and third terminals of said second impedance device, wherein one terminal of said primary winding is connected to said second terminal of said second impedance device, wherein the other terminal of said primary winding is connected through said resistive element to said one terminal of said second impedance device, and wherein said first impedance device includes a resistor directly connected between said first and third conductors and includes said second condenser connected in parallel with the last mentioned resistor.

WALTER C. MICHELS.

REFERENCES CITED

The following references are of record in the file of this patent:

UNITED STATES PATENTS

| Number | Name | Date |
|---|---|---|
| 2,011,442 | Dunn | Aug. 13, 1935 |
| 2,106,793 | Burton | Feb. 1, 1938 |
| 2,120,823 | White | June 14, 1938 |
| 2,400,919 | Crawley | May 28, 1946 |